United States Patent
Minakuchi et al.

(10) Patent No.: US 10,576,714 B2
(45) Date of Patent: Mar. 3, 2020

(54) INTERLAYER FILM FOR LAMINATED GLASS, AND LAMINATED GLASS

(71) Applicant: SEKISUI CHEMICAL CO., LTD., Osaka, Osaka (JP)

(72) Inventors: Nami Minakuchi, Kouka (JP); Tatsuya Iwamoto, Kouka (JP)

(73) Assignee: SEKISUI CHEMICAL CO., LTD., Osaka (JP)

(*) Notice: Subject to any disclaimer, the term of this patent is extended or adjusted under 35 U.S.C. 154(b) by 32 days.

(21) Appl. No.: 15/549,113

(22) PCT Filed: Feb. 5, 2016

(86) PCT No.: PCT/JP2016/053522
§ 371 (c)(1),
(2) Date: Aug. 4, 2017

(87) PCT Pub. No.: WO2016/125897
PCT Pub. Date: Aug. 11, 2016

(65) Prior Publication Data
US 2018/0029336 A1    Feb. 1, 2018

(30) Foreign Application Priority Data

Feb. 5, 2015 (JP) .................................. 2015-021626
Feb. 5, 2015 (JP) .................................. 2015-021627
(Continued)

(51) Int. Cl.
B23B 17/00    (2006.01)
B32B 17/10    (2006.01)
(Continued)

(52) U.S. Cl.
CPC .......... B32B 17/10761 (2013.01); B32B 7/02 (2013.01); B32B 17/10 (2013.01);
(Continued)

(58) Field of Classification Search
CPC ........ B32B 17/10761; B32B 2307/734; B32B 2307/308
See application file for complete search history.

(56) References Cited

U.S. PATENT DOCUMENTS 5,238,743 A    8/1993   Grolig et al.
6,242,088 B1   6/2001   Costa
(Continued)

FOREIGN PATENT DOCUMENTS

CN    101171541 A    4/2008
CN    101678649 A    3/2010
(Continued)

OTHER PUBLICATIONS

International Search Report for the Application No. PCT/JP2016/053522 dated Apr. 26, 2016.
(Continued)

*Primary Examiner* — Michael M Dollinger
(74) *Attorney, Agent, or Firm* — Cheng Law Group, PLLC

(57) ABSTRACT

There is provided an interlayer film for laminated glass with which the production efficiency of laminated glass can be heightened. The interlayer film for laminated glass according to the present invention is an interlayer film for laminated glass having a one-layer structure or a two or more-layer structure and includes a first layer containing a thermoplastic resin, the softening point of the first layer is 60° C. or more, the interlayer film has an MD direction and a TD direction, and with regard to thermal shrinkage ratios obtained when the first inside portion, the second inside portion and the central portion are heated for 20 minutes at 140° C. respectively, all of the thermal shrinkage ratio MD1MAX, the thermal shrinkage ratio MD2MAX and the thermal shrinkage ratio MD3MAX are 45% or less.

14 Claims, 2 Drawing Sheets

(30) Foreign Application Priority Data

Feb. 5, 2015 (JP) ................................ 2015-021628
Feb. 5, 2015 (JP) ................................ 2015-021629

(51) Int. Cl.
*B32B 7/02* (2019.01)
*B32B 27/22* (2006.01)
*B32B 27/30* (2006.01)
*B32B 27/20* (2006.01)
*B32B 27/08* (2006.01)

(52) U.S. Cl.
CPC .. *B32B 17/10036* (2013.01); *B32B 17/10605* (2013.01); *B32B 17/10633* (2013.01); *B32B 27/20* (2013.01); *B32B 27/22* (2013.01); *B32B 27/30* (2013.01); *B32B 27/306* (2013.01); *B32B 27/08* (2013.01); *B32B 2250/03* (2013.01); *B32B 2307/102* (2013.01); *B32B 2307/30* (2013.01); *B32B 2307/308* (2013.01); *B32B 2307/734* (2013.01)

(56) References Cited

U.S. PATENT DOCUMENTS

| | | |
|---|---|---|
| 2001/0028940 A1 | 10/2001 | Costa |
| 2002/0061395 A1 | 5/2002 | Moran et al. |
| 2004/0157071 A1 | 8/2004 | Nugue et al. |
| 2005/0084687 A1 | 4/2005 | Scheirs et al. |
| 2006/0210782 A1 | 9/2006 | Lu |
| 2007/0009714 A1 | 1/2007 | Lee et al. |
| 2007/0172642 A1 | 7/2007 | Fukatani et al. |
| 2007/0287786 A1 | 12/2007 | Yuan |
| 2008/0124540 A1 | 5/2008 | Yuan |
| 2009/0226750 A1 | 9/2009 | Lu |
| 2010/0043946 A1 | 2/2010 | Ogino et al. |
| 2010/0124647 A1 | 5/2010 | Keller et al. |
| 2011/0061714 A1 | 3/2011 | Keller |
| 2011/0097572 A1 | 4/2011 | Yonekura et al. |
| 2012/0034460 A1* | 2/2012 | Tamada ................ B32B 15/082 428/355 N |
| 2012/0244329 A1 | 9/2012 | Iwamoto et al. |
| 2012/0244364 A1 | 9/2012 | Iwamoto et al. |
| 2012/0276374 A1 | 11/2012 | Hino |
| 2013/0022825 A1 | 1/2013 | Meise et al. |
| 2013/0183507 A1 | 7/2013 | Matsuda et al. |
| 2013/0189528 A1 | 7/2013 | Matsuda et al. |
| 2013/0236711 A1 | 9/2013 | Lu |
| 2013/0273685 A1 | 10/2013 | Declerck |
| 2014/0020759 A1 | 1/2014 | Oda et al. |
| 2014/0093739 A1 | 4/2014 | Iwamoto et al. |
| 2014/0227536 A1 | 8/2014 | Iwamoto et al. |
| 2018/0022068 A1 | 1/2018 | Iwamoto et al. |

FOREIGN PATENT DOCUMENTS

| | | |
|---|---|---|
| CN | 102282200 A | 12/2011 |
| CN | 102666422 A | 9/2012 |
| CN | 102673054 A | 9/2012 |
| CN | 102686531 A | 9/2012 |
| CN | 103140450 A | 6/2013 |
| CN | 103153904 A | 6/2013 |
| CN | 103476841 A | 12/2013 |
| EP | 0 877 664 B1 | 11/1998 |
| EP | 2 248 779 A1 | 11/2010 |
| EP | 2 394 971 A1 | 12/2011 |
| EP | 2 612 843 A1 | 7/2013 |
| EP | 2 660 215 A1 | 11/2013 |
| EP | 2 692 781 A1 | 2/2014 |
| EP | 2 826 621 A1 | 1/2015 |
| JP | 3-53152 A | 3/1991 |
| JP | 5-294680 A | 11/1993 |
| JP | 7-314554 A | 12/1995 |
| JP | 10-168255 A | 6/1998 |
| JP | 2007-70200 A | 3/2007 |
| JP | 2008-544878 A | 12/2008 |
| JP | 2009-540065 A | 11/2009 |
| JP | 2010-523449 A | 7/2010 |
| JP | 2011-218610 A | 11/2011 |
| JP | 2011-528382 A | 11/2011 |
| JP | 2013-1611 A | 1/2013 |
| JP | 2013-23692 A | 2/2013 |
| RU | 2 305 269 C2 | 8/2005 |
| TW | 201012642 A1 | 4/2010 |
| TW | 201321186 A1 | 6/2013 |
| WO | WO-2006/122305 A2 | 11/2006 |
| WO | WO-2007/143746 A2 | 12/2007 |
| WO | WO-2012/043816 A1 | 4/2012 |
| WO | WO-2012/043817 A1 | 4/2012 |
| WO | WO-2012/133668 A1 | 10/2012 |
| WO | WO-2013/051454 A1 | 4/2013 |

OTHER PUBLICATIONS

International Search Report for the Application No. PCT/JP2016/053519 dated Apr. 19, 2016.
International Search Report for the Application No. PCT/JP2016/053520 dated Apr. 26, 2016.
International Search Report for the Application No. PCT/JP2016/053521 dated Apr. 26, 2016.
Written Opinion of the International Searching Authority (PCT/ISA/237) for Application No. PCT/JP2016/053522 dated Apr. 26, 2016 English Translation dated Aug. 17, 2017).
Written Opinion of the International Searching Authority (PCT/ISA/237) for Application No. PCT/JP2016/053519 dated Apr. 19, 2016 (English Translation dated Aug. 17, 2017).
Written Opinion of the International Searching Authority (PCT/ISA/237) for Application No. PCT/JP2016/053520 dated Apr. 26, 2016 English Translation dated Aug. 17, 2017).
Written Opinion of the International Searching Authority (PCT/ISA/237) for Application No. PCT/JP2016/053521 dated Apr. 26, 2016 English Translation dated Aug. 17, 2017).
Non-Final Office Action for the U.S. Appl. No. 15/549,059 from United States Patent and Trademark Office dated Dec. 3, 2018.
Supplementary European Search Report for the Application No. EP 16 746 725.7 dated Sep. 12, 2018.
Supplementary European Search Report for the Application No. EP 16 746 726.5 dated Aug. 31, 2018.
Supplementary European Search Report for the Application No. EP 16 746 727.3 dated Sep. 7, 2018.
Supplementary European Search Report for the Application No. EP 16 746 728.1 dated Oct. 23, 2018.
Non-Final Office Action for the U.S. Appl. No. 15/549,089 from United States Patent and Trademark Office dated Feb. 22, 2019.
Zhan, Yixing et al., "Fine Chemical New Product vol. 1", Scientific and Technical Documents Publishing House, 2007, p. 120.
Australian Office Action for the Application No. 2016216327 dated May 3, 2019.
Australian Office Action for the Application No. 2016216328 dated May 10, 2019.
Australian Office Action for the Application No. 2016216329 dated May 3, 2019.
Australian Office Action for the Application No. 2016216389 dated May 3, 2019.
Taiwanese Office Action for the Application No. 105104168 dated May 8, 2019.
Taiwanese Office Action for the Application No. 105104201 dated Jun. 27, 2019.
Russian Office Action for Application No. 2017131063/03(054159) dated Jun. 10, 2019.
Russian Office Action for Application No. 2017131066/03(054162) dated Jun. 10, 2019.
Restriction Requirement Action for the U.S. Appl. No. 15/549,015 from United States Patent and Trademark Office dated Jun. 12, 2019.
Final Office Action for the U.S. Appl. No. 15/549,059 from United States Patent and Trademark Office dated Jun. 5, 2019.

(56) References Cited

OTHER PUBLICATIONS

The First Office Action for the Application No. 201680009105.0 from The State Intellectual Property Office of the People's Republic of China dated May 15, 2019.
The First Office Action for the Application No. 201680009112.0 from The State Intellectual Property Office of the People's Republic of China dated Apr. 30, 2019.
The First Office Action for the Application No. 201680009114.X from The State Intellectual Property Office of the People's Republic of China dated Apr. 30, 2019.
Examination Report for Application No. 201737027921 from the Intellectual Property India Office dated Sep. 27, 2019.
Non-Final Office Action for the U.S. Appl. No. 15/549,015 from United States Patent and Trademark Office dated Aug. 22, 2019.
Examination Report for Application No. 201737027926 from the Intellectual Property India Office dated Oct. 15, 2019.
Ishinabe, Takao et al., "Thermal Shrinkage of Stretched Polyethylene Terephthalate Films", Kobunshi Kagaku, 1972, vol. 29, No. 321, pp. 56-59.
Kambe, Hirotaro, "Thermal Property and Molecular Structure of Polymers", Polymer, 1968, vol. 17, No. 196, pp.650-655.
Notice of Reasons for Refusal for the Application No. 2016-508897 from Japan Patent Office dated Jan. 7, 2020.

\* cited by examiner

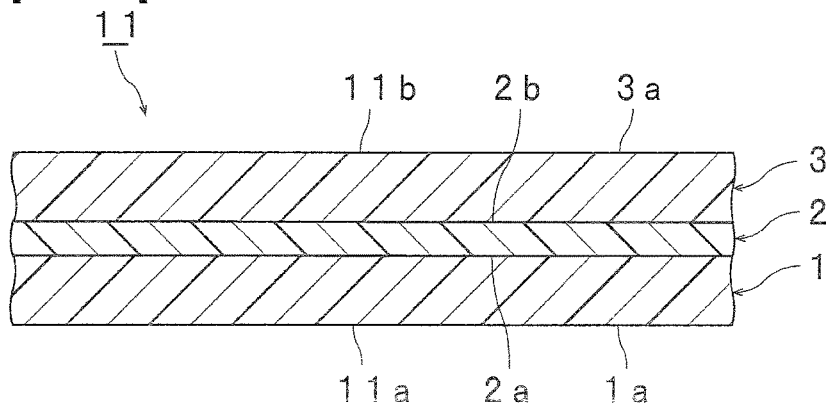
[FIG. 1]
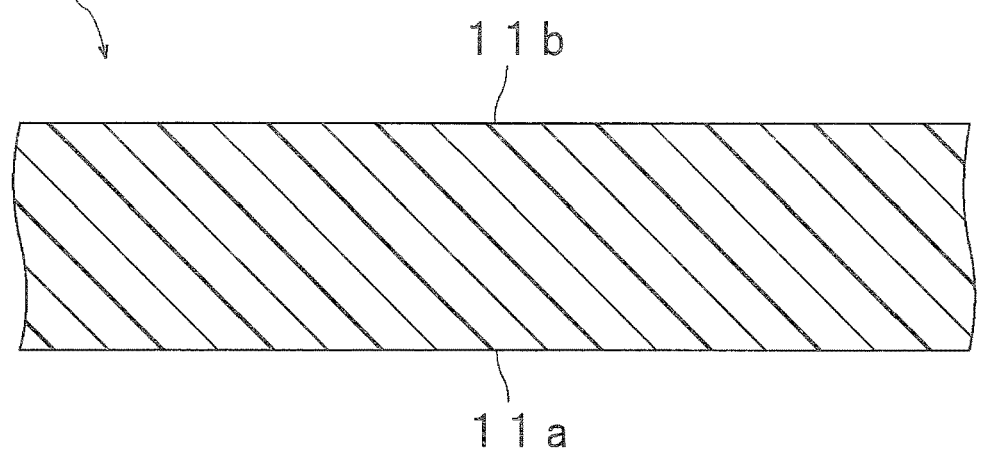
[FIG. 2]
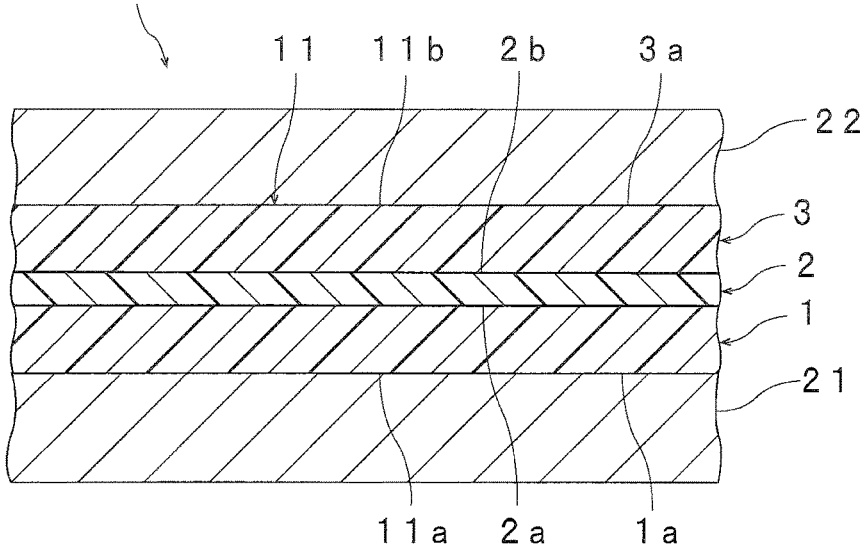
[FIG. 3]

[FIG. 4]
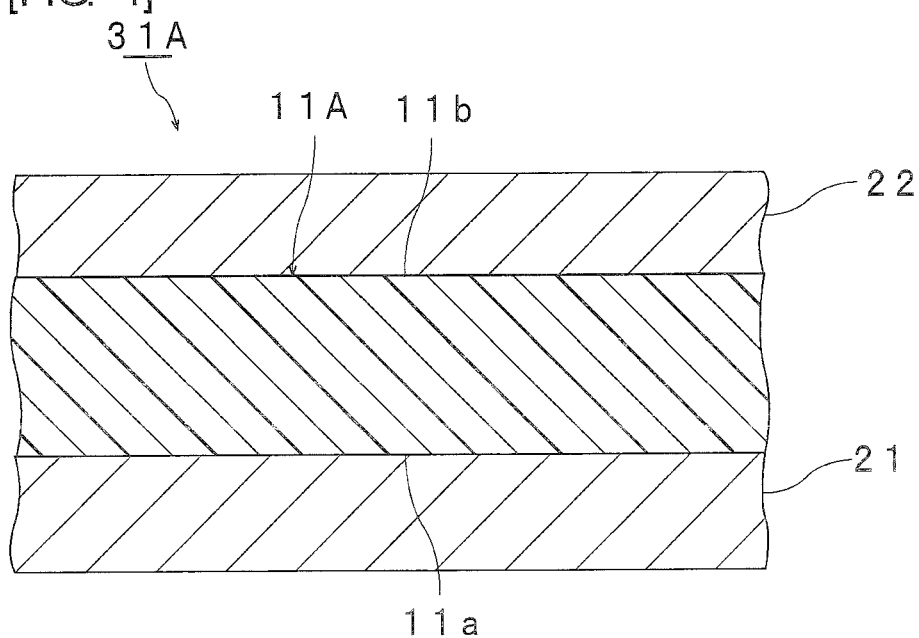
[FIG. 5]
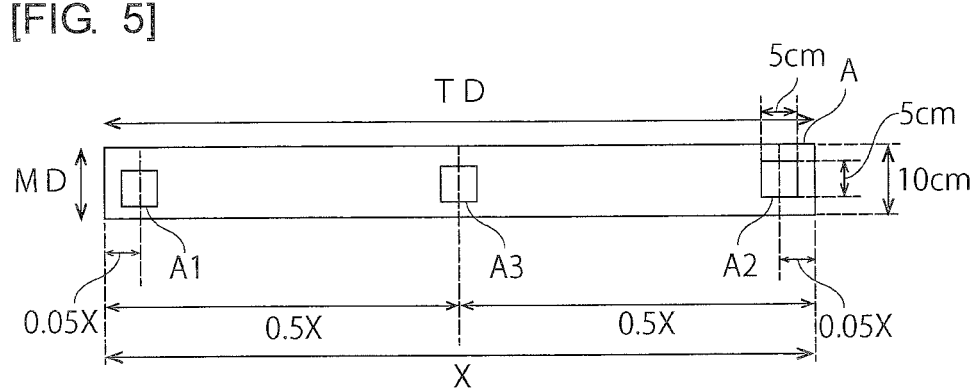

INTERLAYER FILM FOR LAMINATED GLASS, AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings and the like. The laminated glass is produced by sandwiching an interlayer film for laminated glass between two glass plates.

Examples of the interlayer film for laminated glass include a single-layered interlayer film having a one-layer structure and a multi-layered interlayer film having a two or more-layer structure.

As an example of the interlayer film for laminated glass, the following Patent Document 1 discloses a sound insulating layer including 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount greater than 30 parts by weight. This sound insulating layer can be used alone as a single-layered interlayer film.

Furthermore, the following Patent Document 1 also describes a multi-layered interlayer film in which the sound insulating layer and another layer are layered. Another layer to be layered with the sound insulating layer includes 100 parts by weight of a polyvinyl acetal resin with an acetalization degree of 60 to 85% by mole, 0.001 to 1.0 part by weight of at least one kind of metal salt among an alkali metal salt and an alkaline earth metal salt, and a plasticizer in an amount of 30 parts by weight or less.

The following Patent Document 2 discloses an interlayer film which is constituted of a polymer layer having a glass transition temperature of 33° C. or more.

The following Patent Document 3 discloses a polyvinyl acetal-based resin film having a thickness distribution in the width direction of 10% or less and a volatile matter content of 1.0% by mass or less. In this polyvinyl acetal-based resin film, when two 5%-inside portions from both ends in the width direction of the film overall width are heated for 30 minutes at 150° C. respectively, a value of the thermal shrinkage ratio of one 5%-inside portion larger in thermal shrinkage ratio in the flow direction, which is parallel to the film and perpendicular to the width direction is defined as the thermal shrinkage ratio MD1, a value of the thermal shrinkage ratio of the other 5%-inside portion smaller in thermal shrinkage ratio therein is defined as the thermal shrinkage ratio MD2, and a value of the thermal shrinkage ratio of a central portion in the flow direction, which is parallel to the film and perpendicular to the width direction, obtained at the time of heating the central portion in the width direction of the film for 30 minutes at 150° C. is defined as the thermal shrinkage ratio MD3, all of the thermal shrinkage ratio MD1, the thermal shrinkage ratio MD2 and the thermal shrinkage ratio MD3 are 3 to 20%.

RELATED ART DOCUMENTS

Patent Documents

Patent Document 1: JP 2007-070200 A
Patent Document 2: US 2013/0236711 A1
Patent Document 3: WO 2012/133668 A1

SUMMARY OF THE INVENTION

Problems to be Solved by the Invention

For example, laminated glass is used as a windshield of a vehicle. For example, in recent years, for the purpose of improving the fuel consumption of a vehicle, a technique for thinning a glass plate used for laminated glass has been studied. However, when a glass plate used for laminated glass is thinned, there is a problem that the rigidity of laminated glass is lowered.

Moreover, as a method for heightening the rigidity of laminated glass, a method of physically hardening an interlayer film has been studied.

In general, two sheets of glass plates and an interlayer film interposed therebetween, which are laminated so that interlayer film portions (to be trimmed) are protruded from the end part of the glass plate to constitute a laminate, are bonded to one another under a high temperature (autoclave (140° C., 20 minutes)) environment and the interlayer film portions protruded from the end part of the glass plate are cut away (trim-cutting) to produce a sheet of laminated glass. When a hard interlayer film is used to produce a sheet of laminated glass, there is a problem that trim-cutting becomes difficult. As a result, there is a problem that the production efficiency of laminated glass is lowered.

An object of the present invention is to provide an interlayer film for laminated glass with which the production efficiency can be heightened. Moreover, the present invention is also aimed at providing laminated glass prepared with the interlayer film for laminated glass.

Means for Solving the Problems

According to a broad aspect of the present invention, there is provided an interlayer film for laminated glass having a one-layer structure or a two or more-layer structure, including a first layer containing a thermoplastic resin, the softening point of the first layer being 60° C. or more, the interlayer film having an MD direction and a TD direction, and with regard to thermal shrinkage ratios obtained when the following first inside portion, the following second inside portion and the following central portion are heated for 20 minutes at 140° C. respectively, all of the following thermal shrinkage ratio MD1MAX, the following thermal shrinkage ratio MD2MAX and the following thermal shrinkage ratio MD3MAX being 45% or less.

A first inside portion: the first inside portion is represented as a section of 5 cm square which is a portion at a distance of 0.05X from one end in the TD direction toward the inside of the interlayer film when a distance between the one end and the other end in the TD direction of the interlayer film is defined as X.

A second inside portion: the second inside portion is represented as a section of 5 cm square which is a portion at a distance of 0.05X from the other end in the TD direction toward the inside of the interlayer film when a distance between the one end and the other end in the TD direction of the interlayer film is defined as X.

A central portion: the central portion is represented as a section of 5 cm square which is a portion at a distance of 0.5X from each of the one end and the other end in the TD direction toward the inside of the interlayer film when a distance between the one end and the other end in the TD direction of the interlayer film is defined as X.

A thermal shrinkage ratio MD1MAX and a thermal shrinkage ratio MD1MIN: a thermal shrinkage ratio of a side higher in thermal shrinkage ratio and a thermal shrinkage ratio of a side lower in thermal shrinkage ratio are defined as MD1MAX and MD1MIN, respectively, in the case where two sides parallel to the MD direction of the first inside portion are different in thermal shrinkage ratio, or a thermal shrinkage ratio of one side and a thermal shrinkage ratio of the other side are defined as MD1MAX and MD1MIN, respectively, in the case where two sides parallel to the MD direction of the first inside portion are the same in thermal shrinkage ratio.

A thermal shrinkage ratio MD2MAX and a thermal shrinkage ratio MD2MIN: a thermal shrinkage ratio of a side higher in thermal shrinkage ratio and a thermal shrinkage ratio of a side lower in thermal shrinkage ratio are defined as MD2MAX and MD2MIN, respectively, in the case where two sides parallel to the MD direction of the second inside portion are different in thermal shrinkage ratio, or a thermal shrinkage ratio of one side and a thermal shrinkage ratio of the other side are defined as MD2MAX and MD2MIN, respectively, in the case where two sides parallel to the MD direction of the second inside portion are the same in thermal shrinkage ratio.

A thermal shrinkage ratio MD3MAX and a thermal shrinkage ratio MD3MIN: a thermal shrinkage ratio of a side higher in thermal shrinkage ratio and a thermal shrinkage ratio of a side lower in thermal shrinkage ratio are defined as MD3MAX and MD3MIN, respectively, in the case where two sides parallel to the MD direction of the central portion are different in thermal shrinkage ratio, or a thermal shrinkage ratio of one side and a thermal shrinkage ratio of the other side are defined as MD3MAX and MD3MIN, respectively, in the case where two sides parallel to the MD direction of the central portion are the same in thermal shrinkage ratio.

In a specific aspect of the interlayer film for laminated glass according to the present invention, the softening point of the first layer is 61.5° C. or more.

In a specific aspect of the interlayer film for laminated glass according to the present invention, the glass transition temperature of the first layer is 35° C. or more.

In a specific aspect of the interlayer film for laminated glass according to the present invention, the interlayer film further includes a second layer containing a thermoplastic resin, and the first layer is arranged on a first surface side of the second layer.

In a specific aspect of the interlayer film for laminated glass according to the present invention, the thermoplastic resin in the first layer is a polyvinyl acetal resin and the thermoplastic resin in the second layer is a polyvinyl acetal resin.

In a specific aspect of the interlayer film for laminated glass according to the present invention, the content of the hydroxyl group of the polyvinyl acetal resin in the first layer is larger by 9.5% by mole or more than the content of the hydroxyl group of the polyvinyl acetal resin in the second layer.

In a specific aspect of the interlayer film for laminated glass according to the present invention, the second layer contains filler.

In a specific aspect of the interlayer film for laminated glass according to the present invention, the interlayer film further includes a third layer containing a thermoplastic resin, and the third layer is arranged on a second surface side at the opposite side of the first surface of the second layer.

In a specific aspect of the interlayer film for laminated glass according to the present invention, the thermoplastic resin in the first layer is a polyvinyl acetal resin and the content of the hydroxyl group of the polyvinyl acetal resin in the first layer is 33% by mole or more.

In a specific aspect of the interlayer film for laminated glass according to the present invention, the first layer contains a plasticizer and the content of the plasticizer in the first layer is 25 parts by weight or more and 35 parts by weight or less relative to 100 parts by weight of the thermoplastic resin in the first layer.

In a specific aspect of the interlayer film for laminated glass according to the present invention, all of the thermal shrinkage ratio MD1MAX, the thermal shrinkage ratio MD2MAX and the thermal shrinkage ratio MD3MAX are 40% or less.

In a specific aspect of the interlayer film for laminated glass according to the present invention, all of the thermal shrinkage ratio MD1MIN, the thermal shrinkage ratio MD2MIN and the thermal shrinkage ratio MD3MIN are 20% or more.

According to a broad aspect of the present invention, there is provided laminated glass including a first lamination glass member, a second lamination glass member and the interlayer film for laminated glass described above, the interlayer film for laminated glass being arranged between the first lamination glass member and the second lamination glass member.

Effect of the Invention

Since the interlayer film for laminated glass according to the present invention is an interlayer film for laminated glass having a one-layer structure or a two or more-layer structure and includes a first layer containing a thermoplastic resin, the softening point of the first layer is 60° C. or more, the interlayer film has an MD direction and a TD direction, and with regard to thermal shrinkage ratios obtained when the above-described first inside portion, the above-described second inside portion and the above-described central portion are heated for 20 minutes at 140° C. respectively, all of the foregoing thermal shrinkage ratio MD1MAX, the foregoing thermal shrinkage ratio MD2MAX and the foregoing thermal shrinkage ratio MD3MAX are 45% or less, the production efficiency of laminated glass can be heightened.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIG. 5 is a figure for illustrating an object to be measured (an interlayer film) for measuring the thermal shrinkage ratio.

MODE(S) FOR CARRYING OUT THE INVENTION

Hereinafter, the present invention will be described in detail.

The present inventors have found a problem that, when an interlayer film for laminated glass is exposed to a high temperature environment at the time of producing a sheet of laminated glass, a hard interlayer film for laminated glass is more liable to shrink in the MD direction of the interlayer film for laminated glass than a relatively soft interlayer film for laminated glass. Consequently, the present inventors have found a problem that an interlayer film for laminated glass making portions to be trimmed thick due to shrinkage thereof as well as being a hard interlayer film for laminated glass makes trim-cutting difficult. Furthermore, the present inventors have found a problem that an interlayer film for laminated glass provided with a thermoplastic resin layer having a softening point of 60° C. or more is liable to shrink in the MD direction of the interlayer film for laminated glass under a high temperature (for example, autoclave (140° C., 20 minutes)) environment.

For the purpose of solving the above-mentioned problems, the present invention is provided with the following configuration.

The interlayer film for laminated glass (in the present specification, sometimes abbreviated as "the interlayer film") according to the present invention has a one-layer structure or a two or more-layer structure. The interlayer film according to the present invention is provided with a first layer containing a thermoplastic resin.

In the interlayer film according to the present invention, the softening point of the first layer is 60° C. or more. The first layer is relatively hard. The interlayer film provided with such a first layer becomes relatively hard.

The interlayer film according to the present invention has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film.

In the interlayer film according to the present invention, with regard to thermal shrinkage ratios obtained when the following first inside portion, the following second inside portion and the following central portion are heated for 20 minutes at 140° C. respectively, all of the following thermal shrinkage ratio MD1MAX, the following thermal shrinkage ratio MD2MAX and the following thermal shrinkage ratio MD3MAX are 45% or less.

A first inside portion: the first inside portion is represented as a section of 5 cm square which is a portion at a distance of 0.05X (a portion apart by 0.05X) from one end in the TD direction toward the inside of the interlayer film when a distance between the one end and the other end in the TD direction of the interlayer film is defined as X.

A second inside portion: the second inside portion is represented as a section of 5 cm square which is a portion at a distance of 0.05X (a portion apart by 0.05X) from the other end in the TD direction toward the inside of the interlayer film when a distance between the one end and the other end in the TD direction of the interlayer film is defined as X.

A central portion: the central portion is represented as a section of 5 cm square which is a portion at a distance of 0.5X (a portion apart by 0.5X) from each of the one end and the other end in the TD direction toward the inside of the interlayer film when a distance between the one end and the other end in the TD direction of the interlayer film is defined as X.

A thermal shrinkage ratio MD1MAX and a thermal shrinkage ratio MD1MIN: a thermal shrinkage ratio of a side higher in thermal shrinkage ratio and a thermal shrinkage ratio of a side lower in thermal shrinkage ratio are defined as MD1MAX and MD1MIN, respectively, in the case where two sides parallel to the MD direction of the first inside portion are different in thermal shrinkage ratio, or a thermal shrinkage ratio of one side and a thermal shrinkage ratio of the other side are defined as MD1MAX and MD1MIN, respectively, in the case where two sides parallel to the MD direction of the first inside portion are the same in thermal shrinkage ratio.

A thermal shrinkage ratio MD2MAX and a thermal shrinkage ratio MD2MIN: a thermal shrinkage ratio of a side higher in thermal shrinkage ratio and a thermal shrinkage ratio of a side lower in thermal shrinkage ratio are defined as MD2MAX and MD2MIN, respectively, in the case where two sides parallel to the MD direction of the second inside portion are different in thermal shrinkage ratio, or a thermal shrinkage ratio of one side and a thermal shrinkage ratio of the other side are defined as MD2MAX and MD2MIN, respectively, in the case where two sides parallel to the MD direction of the second inside portion are the same in thermal shrinkage ratio.

A thermal shrinkage ratio MD3MAX and a thermal shrinkage ratio MD3MIN: a thermal shrinkage ratio of a side higher in thermal shrinkage ratio and a thermal shrinkage ratio of a side lower in thermal shrinkage ratio are defined as MD3MAX and MD3MIN, respectively, in the case where two sides parallel to the MD direction of the central portion are different in thermal shrinkage ratio, or a thermal shrinkage ratio of one side and a thermal shrinkage ratio of the other side are defined as MD3MAX and MD3MIN, respectively, in the case where two sides parallel to the MD direction of the central portion are the same in thermal shrinkage ratio.

By adopting the above-described configuration in the interlayer film according to the present invention, the production efficiency of laminated glass can be heightened.

In the interlayer film according to the present invention, in spite of the existence of the first layer having a softening point of 60° C. or more, the interlayer film for laminated glass is less liable to shrink in the MD direction under a high temperature (for example, autoclave (140° C., 20 minutes)) environment. As such, trim-cutting at the time of producing a sheet of laminated glass can be easily performed. As such, the production efficiency of laminated glass can be heightened.

From the viewpoint of further heightening the production efficiency of laminated glass, each of the thermal shrinkage ratio MD1MIN, the thermal shrinkage ratio MD2MIN and the thermal shrinkage ratio MD3MIN is preferably 15% or more, more preferably 20% or more, further preferably more than 20% and especially preferably 25% or more. From the viewpoint of effectively heightening the production efficiency of laminated glass, each of the thermal shrinkage ratio MD1MAX, the thermal shrinkage ratio MD2MAX and the thermal shrinkage ratio MD3MAX is preferably 45% or less, more preferably 40% or less and further preferably 35% or less. It is preferred that, among the thermal shrinkage ratio MD1MAX, the thermal shrinkage ratio MD2MAX and the thermal shrinkage ratio MD3MAX, at least one thermal shrinkage ratio be more than 20%.

Examples of a method for attaining the above-mentioned thermal shrinkage ratio include a method of relaxing the stress of an interlayer film, and the like. Specifically, examples thereof include a method of subjecting an interlayer film to an annealing treatment, a method of weakening the force for drawing an interlayer film in the extrusion process, and the like. Moreover, by adjusting the aging temperature at the time of synthesizing a polyvinyl acetal resin, the shrinkage by heating of the resulting interlayer film can be controlled. In the extrusion process, when a case 1 in which an interlayer film in a state of having a high temperature (for example, a case of more than 90° C.) is drawn and a case 2 in which an interlayer film in a state of having a low temperature (for example, a case of 90° C. or less) is drawn are compared, there is a tendency that the thermal shrinkage ratio of the interlayer film in the case 2 becomes higher than the thermal shrinkage ratio of the interlayer film in the case 1. Furthermore, in the extrusion process, even if two interlayer films are in a state of having the same temperature, when a case 3 in which an interlayer film is drawn by strong force (for example, a case of relatively fast linear velocity) and a case 4 in which an interlayer film is drawn by weak force (for example, a case of relatively slow linear velocity) are compared, there is a tendency that the thermal shrinkage ratio of the interlayer film in the case 3 becomes higher than the thermal shrinkage ratio of the interlayer film in the case 4.

Objects to be measured (an interlayer film A1, an interlayer film A2 and an interlayer film A3) for measuring the thermal shrinkage ratio in the MD direction of the first inside portion, the thermal shrinkage ratio in the MD direction of the second inside portion and the thermal shrinkage ratio in the MD direction of the central portion can be obtained in the following manner.

As shown in FIG. 5, an interlayer film is cut from one end to the other end in the TD direction so that the dimension in the MD direction of the interlayer film becomes 10 cm to obtain an interlayer film A. By a method in which the dimensional change of the interlayer film A is not suppressed (the interlayer film A is allowed to stand on a net rack and remain in place, or the like), the moisture control thereof is performed for 2 days at 23° C. and 30% RH. Afterward, as shown in FIG. 5, from the moisture-controlled interlayer film A, an interlayer film A1 (a test specimen) as a section of 5 cm square which is a portion at a distance of 0.05X from the one end in the TD direction toward the inside, an interlayer film A2 (a test specimen) as a section of 5 cm square which is a portion at a distance of 0.05X from the other end in the TD direction toward the inside, and an interlayer film A3 (a test specimen) as a section of 5 cm square which is a portion at a distance of 0.5X from each of the one end and the other end in the TD direction of the interlayer film toward the inside are obtained. The interlayer film A1 is positioned so that a line segment at a distance of 0.05X from the one end in the TD direction toward the inside is overlapped with the center line of the interlayer film A1 to obtain the interlayer film A1 with a square shape of 5 cm square. The interlayer film A2 is positioned so that a line segment at a distance of 0.05X from the other end in the TD direction toward the inside is overlapped with the center line of the interlayer film A2 to obtain the interlayer film A2 with a square shape of 5 cm square. The interlayer film A3 is positioned so that a line segment at a distance of 0.5X from each of the one end and the other end in the TD direction toward the inside is overlapped with the center line of the interlayer film A3 to obtain the interlayer film A3 with a square shape of 5 cm square.

The interlayer film A1, the interlayer film A2 and the interlayer film A3 are heated for 20 minutes at 140° C. respectively. At the time of being heated, the interlayer film A1, the interlayer film A2 and the interlayer film A3 are not fixed and are horizontally laid on a fluororesin sheet ("Article number 7-363" available from AS ONE Corporation, 5 mm in thickness) placed inside a hot air dryer (a program constant-temperature drying oven "Model type DO-600FPA" available from AS ONE Corporation). In this connection, the fluororesin sheet is placed inside a hot air dryer at 140° C. to be preheated for 20 minutes, after which the interlayer film A1, the interlayer film A2 and the interlayer film A3 are horizontally laid on the fluororesin sheet preheated.

Before and after the heat treatment, the interlayer film is measured for the length in the MD direction with precision of the 0.1 cm unit. Among two sides parallel to the MD direction of the interlayer film A1, the length of a side at one end side in the TD direction is measured to calculate a thermal shrinkage ratio. The measurement of the thermal shrinkage ratio is performed three times in the same manner, and an average value thereof is defined as the thermal shrinkage ratio of a side at one end side in the TD direction among two sides parallel to the MD direction of the interlayer film A1. Then, among two sides parallel to the MD direction of the interlayer film A1, the length of a side at the other end side in the TD direction is measured to calculate a thermal shrinkage ratio. The measurement of the thermal shrinkage ratio is performed three times in the same manner, and an average value thereof is defined as the thermal shrinkage ratio of a side at the other end side in the TD direction between two sides parallel to the MD direction of the interlayer film A1. Furthermore, the thermal shrinkage ratio of a side at one end side in the TD direction of the interlayer film A1 and the thermal shrinkage ratio of a side at the other end side in the TD direction thereof are compared, and the thermal shrinkage ratio of a side higher in thermal shrinkage ratio is defined as MD1MAX and the thermal shrinkage ratio of a side lower in thermal shrinkage ratio is defined as MD1MIN. In this connection, when the thermal shrinkage ratio of a side at one end side in the TD direction of the interlayer film A1 and the thermal shrinkage ratio of a side at the other end side in the TD direction thereof are the same as each other, two numerical values of MD1MAX and MD1MIN coincide with each other. Similarly, MD2MAX and MD2MIN of the interlayer film A2 and MD3MAX and MD3MIN of the interlayer film A3 are determined respectively.

The thermal shrinkage ratio is determined by the following Equation (X).

$$\text{Thermal shrinkage ratio \%} = (\text{dimension in } MD \text{ direction before heat treatment} - \text{dimension in } MD \text{ direction after heat treatment})/\text{dimension in } MD \text{ direction before heat treatment} \times 100 \qquad \text{Equation (X)}$$

Moreover, when the dimension in the TD direction of the interlayer film is 15 cm or more and less than 50 cm, with regard to the interlayer film A1 and the interlayer film A2, square-shaped interlayer films with a 5-cm side in the TD direction and a 5-cm side in the MD direction are cut out from portions at one end and the other end of the interlayer film, respectively. Furthermore, when the dimension in the TD direction of the interlayer film is less than 15 cm, with regard to the interlayer film A1, the interlayer film A2 and the interlayer film A3, based on a dimension in the TD direction obtained when the distance in the TD direction is divided into three equal lengths, square-shaped interlayer films are cut out therefrom. In this connection, the preferred lower limit of the dimension in the TD direction of the interlayer film is 50 cm, the more preferred lower limit thereof is 70 cm, the further preferred lower limit thereof is 80 cm, the preferred upper limit thereof is 500 cm, the more preferred upper limit thereof is 400 cm and the further preferred upper limit thereof is 300 cm.

The interlayer film may have a one-layer structure, may have a two-layer structure, may have a two or more-layer structure, may have a three-layer structure and may have a three or more-layer structure. When the interlayer film is an interlayer film having a one-layer structure, the first layer corresponds to the interlayer film. When the interlayer film is an interlayer film having a two or more-layer structure, the interlayer film is provided with the first layer and an additional layer (a second layer, a third layer and the like).

From the viewpoint of further heightening the production efficiency of laminated glass, it is preferred that the interlayer film be provided with the first layer as a surface layer. It is preferred that the interlayer film be provided with a third layer described below as a surface layer.

Hereinafter, specific embodiments of the present invention will be described with reference to the drawings.

FIG. 1 shows an interlayer film for laminated glass in accordance with a first embodiment of the present invention schematically represented as a sectional view.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2 and a third layer 3. The first layer 1 is arranged on a first surface 2a of the second layer 2 to be layered thereon. The third layer 3 is arranged on a second surface 2b at the opposite side of the first surface 2a of the second layer 2 to be layered thereon. The second layer 2 is an intermediate layer. Each of the first layer 1 and the third layer 3 is a protective layer and is a surface layer in the present embodiment. The second layer 2 is arranged between the first layer 1 and the third layer 3 to be sandwiched therebetween. Accordingly, the interlayer film 11 has a multilayer structure (a first layer 1/a second layer 2/a third layer 3) in which the first layer 1, the second layer 2 and the third layer 3 are layered in this order.

In this connection, other layers may be arranged between the first layer 1 and the second layer 2 and between the second layer 2 and the third layer 3, respectively. It is preferred that each of the first layer 1 and the third layer 3 be directly layered on the second layer 2. Examples of another layer include a layer containing polyethylene terephthalate and the like.

FIG. 2 shows an interlayer film for laminated glass in accordance with a second embodiment of the present invention schematically represented as a sectional view.

The interlayer film 11A shown in FIG. 2 is a single-layered interlayer film having a one-layer structure. The interlayer film 11A is singly constituted by a first layer. The interlayer film 11A is used for obtaining laminated glass. The interlayer film 11A is an interlayer film for laminated glass.

The interlayer film may be provided with a second layer as an intermediate layer of the interlayer film or a layer which is not a surface layer of the interlayer film. It is preferred that the interlayer film be provided with a first layer as a surface layer of the interlayer film. It is preferred that the interlayer film be provided with a third layer as a surface layer of the interlayer film.

Hereinafter, the details of the first layer, the second layer and the third layer which constitute the interlayer film according to the present invention, and the details of each ingredient contained in the first layer, the second layer and the third layer will be described.

(Polyvinyl Acetal Resin or Thermoplastic Resin)

The first layer contains a thermoplastic resin (hereinafter, sometimes described as a thermoplastic resin (1)), and it is preferred that the first layer contain a polyvinyl acetal resin (hereinafter, sometimes described as a polyvinyl acetal resin (1)) as the thermoplastic resin (1). The second layer contains a thermoplastic resin (hereinafter, sometimes described as a thermoplastic resin (2)), and it is preferred that the second layer contain a polyvinyl acetal resin (hereinafter, sometimes described as a polyvinyl acetal resin (2)) as the thermoplastic resin (2). The third layer contains a thermoplastic resin (hereinafter, sometimes described as a thermoplastic resin (3)), and it is preferred that the third layer contain a polyvinyl acetal resin (hereinafter, sometimes described as a polyvinyl acetal resin (3)) as the thermoplastic resin (3). Although the polyvinyl acetal resin (1), the polyvinyl acetal resin (2) and the polyvinyl acetal resin (3) may be the same as or different from one another, it is preferred that the polyvinyl acetal resin (2) be different from the polyvinyl acetal resin (1) and the polyvinyl acetal resin (3) because the sound insulating properties are further heightened. The thermoplastic resin (1) and the thermoplastic resin (3) may be the same as or different from each other. One kind of each of the polyvinyl acetal resin (1), the polyvinyl acetal resin (2) and the polyvinyl acetal resin (3) may be used alone, and two or more kinds thereof may be used in combination. One kind of each of the thermoplastic resin (1), the thermoplastic resin (2) and the thermoplastic resin (3) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaidehyde, n-nonylaidehyde, n-decylaldehyde, benzaldehyde, and the like. Of these, acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content ratio of the hydroxyl group (the amount of hydroxyl groups) of the polyvinyl acetal resin (2) is preferably 17% by mole or more, more preferably 20% by mole or more, further preferably 22% by mole or more, preferably 30% by mole or less, more preferably less than 27% by mole, further preferably 25% by mole or less and especially preferably less than 25% by mole. When the content of the hydroxyl group is the above lower limit or more, the adhesive force of the interlayer film is further heightened. In particular, when the content of the hydroxyl group of the polyvinyl acetal resin (2) is 20% by mole or more, the resin is high in reaction efficiency and is excellent in productivity, and moreover, when less than 27% by mole, the sound insulating properties of laminated glass are further heightened. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (1) and the polyvinyl acetal resin (3) is preferably 25% by mole or more, more preferably 28% by mole or more, more preferably 30% by mole or more, even more preferably more than 31% by mole, further preferably 31.5% by mole or more, still further preferably 32% by mole or more, especially preferably 33% by mole or more, preferably 37% by mole or less, more preferably 36.5% by mole or less and further preferably 36% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoints of enhancing the rigidity of laminated glass and effectively heightening the production efficiency of laminated glass, it is especially preferred that the content of the hydroxyl group of each of the polyvinyl acetal resin (1) and the polyvinyl acetal resin (3) be 33% by mole or more.

From the viewpoint of further heightening the sound insulating properties, it is preferred that each of the content of the hydroxyl group of the polyvinyl acetal resin (1) and the content of the hydroxyl group of the polyvinyl acetal resin (3) be larger than the content of the hydroxyl group of the polyvinyl acetal resin (2). From the viewpoint of still further heightening the sound insulating properties, each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (3) and the content of the hydroxyl group of the polyvinyl acetal resin (2) is preferably 1% by mole or more, more preferably 5% by mole or more, further preferably 9% by mole or more, still further preferably 9.5% by mole or more, especially preferably 10% by mole or more and most preferably 12% by mole or more. Each of the absolute value of the difference between the content of the hydroxyl group of the polyvinyl acetal resin (1) and the content of the hydroxyl group of the polyvinyl acetal resin (2) and the absolute value of the difference between the content of the hydroxyl group of the polyvinyl acetal resin (3) and the content of the hydroxyl group of the polyvinyl acetal resin (2) is preferably 20% by mole or less.

From the viewpoints of enhancing the rigidity of laminated glass and effectively heightening the production efficiency of laminated glass, it is especially preferred that the content of the hydroxyl group of the polyvinyl acetal resin (1) be larger by 9.5% by mole or more than the content of the hydroxyl group of the polyvinyl acetal resin (2). From the viewpoint of further heightening the production efficiency of laminated glass, it is especially preferred that the content of the hydroxyl group of the polyvinyl acetal resin (3) be larger by 9.5% by mole or more than the content of the hydroxyl group of the polyvinyl acetal resin (2).

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral" to be determined.

The acetylation degree (the amount of acetyl groups) of the polyvinyl acetal resin (2) is preferably 0.01% by mole or more, more preferably 0.1% by mole or more, even more preferably 7% by mole or more, further preferably 9% by mole or more, preferably 30% by mole or less, more preferably 25% by mole or less, further preferably 24% by mole or less and especially preferably 20% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (2) is 0.1% by mole or more and 25% by mole or less, the resulting laminated glass is excellent in penetration resistance.

The acetylation degree of each of the polyvinyl acetal resin (1) and the polyvinyl acetal resin (3) is preferably 0.01% by mole or more, more preferably 0.5% by mole or more, preferably 10% by mole or less and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (2) (the butyralization degree in the case of a polyvinyl butyral resin) is preferably 47% by mole or more, more preferably 60% by mole or more, preferably 85% by mole or less, more preferably 80% by mole or less and further preferably 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (1) and the polyvinyl acetal resin (3) (the butyralization degree in the case of a polyvinyl butyral resin) is preferably 55% by mole or more, more preferably 60% by mole or more, preferably 75% by mole or less and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (2) be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (1) and the polyvinyl acetal resin (3) may be the polyvinyl acetal resin (A) and may be the polyvinyl acetal resin (B).

The acetylation degree (a) of the polyvinyl acetal resin (A) is less than 8% by mole, preferably 7.9% by mole or less, more preferably 7.8% by mole or less, further preferably 6.5% by mole or less, especially preferably 6% by mole or less, preferably 0.1% by mole or more, more preferably 0.5% by mole or more, further preferably 5% by mole or more and especially preferably 5.5% by mole or more. When the acetylation degree (a) is 0.1% by mole or more and less than 8% by mole, the transfer of a plasticizer can be easily controlled and the sound insulating properties of laminated glass are further heightened.

The acetalization degree (a) of the polyvinyl acetal resin (A) is 65% by mole or more, preferably 66% by mole or more, more preferably 67% by mole or more, further preferably 67.5% by mole or more, especially preferably 75% by mole or less, preferably 85% by mole or less, more preferably 84% by mole or less, further preferably 83% by mole or less and especially preferably 82% by mole or less.

When the acetalization degree (a) is the above lower limit or more, the sound insulating properties of laminated glass are further heightened. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, most preferably 23% by mole or more, preferably 31% by mole or less, more preferably 30% by mole or less, further preferably 29% by mole or less and especially preferably 28% by mole or less. When the content (a) of the hydroxyl group is the above lower limit or more, the adhesive force of the second layer is further heightened. When the content (a) of the hydroxyl group is the above upper limit or less, the sound insulating properties of laminated glass are further heightened.

The acetylation degree (b) of the polyvinyl acetal resin (B) is 8% by mole or more, preferably 9% by mole or more, more preferably 9.5% by mole or more, further preferably 10% by mole or more, especially preferably 10.5% by mole or more, preferably 30% by mole or less, more preferably 28% by mole or less, further preferably 26% by mole or less and especially preferably 24% by mole or less. When the acetylation degree (b) is the above lower limit or more, the sound insulating properties of laminated glass are further heightened. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, preferably 78% by mole or less, more preferably 75% by mole or less, further preferably 72% by mole or less and especially preferably 70% by mole or less. When the acetalization degree (b) is the above lower limit or more, the sound insulating properties of laminated glass are further heightened. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, most preferably 23% by mole or more, preferably 31% by mole or less, more preferably 30% by mole or less, further preferably 29% by mole or less and especially preferably 28% by mole or less. When the content (b) of the hydroxyl group is the above lower limit or more, the adhesive force of the second layer is further heightened. When the content (b) of the hydroxyl group is the above upper limit or less, the sound insulating properties of laminated glass are further heightened.

It is preferred that each of the polyvinyl acetal resin (A) and the polyvinyl acetal resin (B) be a polyvinyl butyral resin.

(Plasticizer)

It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the adhesive force of a layer containing the polyvinyl acetal resin and the plasticizer to a lamination glass member or another layer is moderately heightened. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

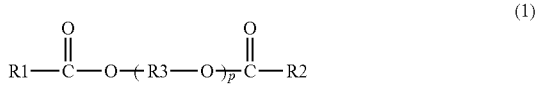

(1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

Each of the content of the plasticizer (1) (hereinafter, sometimes described as the content (1)) relative to 100 parts by weight of the thermoplastic resin (1) (100 parts by weight of a polyvinyl acetal resin (1) when the thermoplastic resin (1) is the polyvinyl acetal resin (1)) and the content of the plasticizer (3) (hereinafter, sometimes described as the content (3)) relative to 100 parts by weight of the thermoplastic resin (3) (100 parts by weight of a polyvinyl acetal resin (3) when the thermoplastic resin (3) is the polyvinyl acetal resin (3)) is preferably 10 parts by weight or more, more preferably 15 parts by weight or more, further preferably 20 parts by weight or more, still further preferably 25 parts by weight or more, especially preferably 30 parts by weight or more, preferably 40 parts by weight or less, more preferably 39 parts by weight or less, further preferably 35 parts by weight or less, still further preferably 32 parts by weight or less and especially preferably 30 parts by weight or less. When the content (1) and the content (3) are the above lower limit or more, the flexibility of the interlayer film is enhanced and the handling of the interlayer film is facilitated. When the content (1) and the content (3) are the above upper limit or less, the penetration resistance of laminated glass is further enhanced.

From the viewpoints of enhancing the rigidity of laminated glass and effectively heightening the production efficiency of laminated glass, it is preferred that the content (1) be 25 parts by weight or more and 35 parts by weight or less. From the viewpoint of effectively heightening the production efficiency of laminated glass, it is preferred that the content (3) be 25 parts by weight or more and 35 parts by weight or less.

The content of the plasticizer (2) (hereinafter, sometimes described as the content (2)) relative to 100 parts by weight of the thermoplastic resin (2) (100 parts by weight of a polyvinyl acetal resin (2) when the thermoplastic resin (2) is the polyvinyl acetal resin (2)) is preferably 50 parts by weight or more, more preferably 55 parts by weight or more, further preferably 60 parts by weight or more, preferably 100 parts by weight or less, more preferably 90 parts by weight or less, further preferably 85 parts by weight or less and especially preferably 80 parts by weight or less. When the content (2) is the above lower limit or more, the flexibility of the interlayer film is enhanced and the handling of the interlayer film is facilitated. When the content (2) is the above upper limit or less, the penetration resistance of laminated glass is further enhanced.

For the purpose of heightening the sound insulating properties of laminated glass, it is preferred that the content (2) be larger than the content (1) and it is preferred that the content (2) be larger than the content (3).

From the viewpoint of further heightening the sound insulating properties of laminated glass, each of the absolute value of the difference between the content (1) and the content (2) and the absolute value of the difference between the content (3) and the content (2) is preferably 10 parts by weight or more, more preferably 15 parts by weight or more, further preferably 20 parts by weight or more and especially preferably more than 25 parts by weight. Each of the absolute value of the difference between the content (1) and the content (2) and the absolute value of the difference between the content (3) and the content (2) is preferably 80 parts by weight or less, more preferably 75 parts by weight or less and further preferably 70 parts by weight or less.

(Filler)

It is preferred that the second layer contain a kind of filler. The first layer may contain a kind of filler. The third layer may contain a kind of filler.

Examples of the filler include calcium carbonate particles, silica particles, and the like. It is preferred that the filler be constituted of calcium carbonate particles or silica particles, and it is more preferred that the filler be constituted of silica particles. By the use of the filler, the sound insulating properties and the flexural rigidity are enhanced, and furthermore, the adhesive force between respective layers is also heightened. One kind of the filler may be used alone, and two or more kinds thereof may be used in combination.

The specific surface area by the BET method of the silica particle is preferably 50 $m^2/g$ or more, more preferably 100 $m^2/g$ or more, further preferably 200 $m^2/g$ or more, especially preferably 250 $m^2/g$ or more, most preferably 300 $m^2/g$ or more and preferably 500 $m^2/g$ or less. The specific surface area can be measured by a gas adsorption method using a specific surface area/fine pore distribution measuring apparatus. Examples of the measuring apparatus include "ASAP 2420" available from SHIMADZU CORPORATION, and the like.

In the second layer, relative to 100 parts by weight of the thermoplastic resin (2), the content of the filler is preferably 2 parts by weight or more, more preferably 5 parts by weight or more, further preferably 10 parts by weight or more, preferably 65 parts by weight or less, more preferably 60 parts by weight or less, further preferably 50 parts by weight or less and especially preferably 30 parts by weight or less. When the content of the filler is the above lower limit or more and the above upper limit or less, the adhesive force between respective layers is further heightened and the flexural rigidity is further enhanced. When the content of the filler is the above upper limit or less, the sound insulating properties are further heightened.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD), or the like.

In 100% by weight of a layer containing the heat shielding particles (a first layer, a second layer or a third layer), each content of the heat shielding particles is preferably 0.01% by weight or more, more preferably 0.1% by weight or more, further preferably 1% by weight or more, especially preferably 1.5% by weight or more, preferably 6% by weight or less, more preferably 5.5% by weight or less, further preferably 4% by weight or less, especially preferably 3.5% by weight or less and most preferably 3% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that the interlayer film include at least one kind of metal salt (hereinafter, sometimes described as Metal salt M) among an alkali metal salt and an alkaline earth metal salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member or the adhesivity between respective layers in the interlayer film is facilitated. One kind of the Metal salt M may be used alone, and two or more kinds thereof may be used in combination.

It is preferred that the Metal salt M contain at least one kind of metal selected from the group consisting of Li, Na, K, Rb, Cs, Mg, Ca, Sr and Ba. It is preferred that the metal salt included in the interlayer film contain at least one kind of metal between K and Mg.

Moreover, it is more preferred that the Metal salt M be an alkali metal salt of an organic acid with 2 to 16 carbon atoms or an alkaline earth metal salt of an organic acid with 2 to 16 carbon atoms, and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer or a third layer) is preferably 5 ppm or more, more preferably 10 ppm or more, further preferably 20 ppm or more, preferably 300 ppm or less, more preferably 250 ppm or less and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet Ray Screening Agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include ultraviolet ray screening agents having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate] methane, 1,3,3-tris-(2-methyl-4-hydroxy-5-t-butylphenol) butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer and the third layer may contain additives such as a coupling agent containing silicon, aluminum or titanium, a dispersing agent, a surfactant, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be used in combination.

(Other Details of Interlayer Film for Laminated Glass)

From the viewpoints of enhancing the rigidity of laminated glass and effectively heightening the production efficiency of laminated glass, the softening point of the first layer is 60° C. or more. From the viewpoints of further enhancing the rigidity of the interlayer film and effectively heightening the production efficiency of laminated glass in which a gap is suppressed, the softening point of the first layer is preferably 61.5° C. or more, more preferably 62.5° C. or more, even more preferably 64° C. or more, further preferably 65° C. or more, still further preferably 66° C. or more and especially preferably 70° C. or more. From the viewpoints of further enhancing the rigidity of the interlayer film and effectively heightening the production efficiency of laminated glass in which a gap is suppressed, the softening point of the third layer is preferably 58° C. or more, more preferably 60° C. or more, even more preferably 61.5° C. or more, further preferably 62.5° C. or more, further preferably 64° C. or more, further preferably 65° C. or more, still further preferably 66° C. or more and most preferably 70° C. or more. The upper limit of the softening point of each of the first layer and the third layer is not particularly limited. The softening point of each of the first layer and the third layer is preferably 80° C. or less, more preferably 78° C. or less, further preferably 76° C. or less and especially preferably 75° C. or less.

From the viewpoints of further enhancing the rigidity of laminated glass and effectively heightening the production efficiency of laminated glass, the glass transition temperature of each of the first layer and the third layer is preferably 31° C. or more, more preferably 35° C. or more and further preferably 38° C. or more. The upper limit of the glass transition temperature of each of the first layer and the third layer is not particularly limited. The glass transition temperature of each of the first layer and the third layer is preferably 48° C. or less and more preferably 46° C. or less.

The softening point and the glass transition temperature are measured in the following manner.

The interlayer film obtained is stored for 1 month or more or 1 month at a temperature of 23° C. and a humidity of 30%, after which, when the interlayer film is a multi-layered interlayer film, each of the first layer and the third layer is peeled off to be isolated and press-molded with a press molding machine to obtain an object to be measured. And with regard to the object to be measured, the measurement is performed using the "ARES-G2" available from TA Instruments Japan Inc. In this connection, when the interlayer film is a single-layered interlayer film, the interlayer film is cut so as to have a diameter of 8 mm to be measured. A parallel plate with a diameter of 8 mm is used as a jig, and the measurement is performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent is defined as the glass transition temperature Tg (° C.). The temperature at which a value of the loss tangent in a temperature region between 100° C. and Tg (° C.) becomes minimal is defined as the softening point. Although the period for storing the obtained interlayer film at a temperature of 23° C. and a humidity of 30% is not particularly limited as long as the period is one month or more, it is preferred that the period be one month. Moreover, although the thickness of an object to be measured is not particularly limited, for example, it is preferred that the thickness lie within the range of 300 to 800 μm.

The thickness of the interlayer film is not particularly limited. From the viewpoint of the practical aspect and the viewpoint of sufficiently enhancing the penetration resistance of laminated glass, the thickness of the interlayer film is preferably 0.1 mm or more, more preferably 0.25 mm or more, preferably 3 mm or less and more preferably 1.5 mm or less. When the thickness of the interlayer film is the above lower limit or more, the penetration resistance of laminated glass is enhanced. When the thickness of the interlayer film is the above upper limit or less, the transparency of the interlayer film is further improved.

It is preferred that the interlayer film be obtained by melt extrusion molding.

The production method of the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Since the production efficiency of the interlayer film is excellent, it is preferred that respective polyvinyl acetal resins contained in the first layer and the third layer be the same as each other, it is more preferred that respective polyvinyl acetal resins contained in the first layer and the third layer be the same as each other and respective plasticizers contained therein be the same as each other, and it is further preferred that the first layer and the third layer be formed from the same resin composition as each other. Moreover, the sectional shape of the interlayer film may be a rectangular shape and may be a wedge-like shape.

It is preferred that an emboss pattern be imparted to a surface of the interlayer film. When the softening point of the outermost surface portion of the interlayer film is high, there is a case where it is difficult to perform emboss processing and there is a case where an emboss pattern is not collapsed in the production process of laminated glass and thus bubbles are generated inside the laminated glass. However, by appropriately adjusting the temperature of the interlayer film, the applied pressure or the temperature of an embossing roll at the time of imparting an emboss pattern thereto, an appropriate emboss pattern can be imparted thereto. Moreover, when the softening point of the outermost surface portion of the interlayer film is high, although there is a problem that friction between two interlayer films or between the interlayer film and a glass plate becomes difficult to be generated, the above-mentioned problem can be solved by imparting an appropriate emboss pattern thereto.

(Laminated Glass)

FIG. 3 is a sectional view schematically showing an example of laminated glass prepared with the interlayer film for laminated glass shown in FIG. 1.

The laminated glass 31 shown in FIG. 3 is provided with a first lamination glass member 21, a second lamination glass member 22 and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 1a of a first layer 1. The second lamination glass member 22 is layered on an outer surface 3a of a third layer 3.

FIG. 4 is a sectional view schematically showing an example of laminated glass prepared with the interlayer film for laminated glass shown in FIG. 2.

The laminated glass 31A shown in FIG. 4 is provided with a first lamination glass member 21, a second lamination glass member 22 and an interlayer film 11A. The interlayer film 11A is arranged between the first lamination glass member 21 and the second lamination glass member 22 to be sandwiched therebetween.

The first lamination glass member 21 is layered on a first surface 11a of the interlayer film 11A. The second lamination glass member 22 is layered on a second surface 11b opposite to the first surface 11a of the interlayer film 11A.

As described above, the laminated glass is provided with a first lamination glass member, a second lamination glass member and an interlayer film, and the interlayer film is the interlayer film for laminated glass according to the present invention. In the laminated glass, the above-mentioned interlayer film is arranged between the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member. It is preferred that both of the first lamination glass member and the second lamination glass member be glass plates (a first glass plate and a second glass plate). The interlayer film is arranged between a first glass plate and a second glass plate to suitably obtain laminated glass.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, preferably 5 mm or less, more preferably 3 mm or less and further preferably 1.8 mm or less. Moreover, when the lamination glass member is a glass plate, the thickness of the glass plate is preferably 0.5 mm or more, more preferably 0.7 mm or more, preferably 5 mm or less and more preferably 3 mm or less. When the lamination glass member is a PET film, the thickness of the PET film is preferably 0.03 mm or more and preferably 0.5 mm or less. Although the lamination glass member may be a flat sheet of glass and may be a curved sheet of glass, for example, when the thickness of the lamination glass member is 1.8 mm or less, the rigidity of laminated glass can be enhanced by using the curved sheet of glass. Moreover, although there is a case where it is difficult to make an interlayer film with a high softening point fit into a curved shape of the curved sheet of glass, by imparting an emboss pattern to the interlayer film, it becomes easy to make the interlayer film fit into a curved shape of the curved sheet of glass.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

From the viewpoint of obtaining laminated glass further excellent in transparency, the visible light transmittance of laminated glass is preferably 65% or more and more preferably 70% or more. The visible light transmittance of laminated glass can be measured in accordance with JIS R3211 (1998). It is preferred that the visible light transmittance of laminated glass obtained by sandwiching the interlayer film for laminated glass according to the present invention between two sheets of green glass (heat ray-absorbing plate glass) with a thickness of 2 mm in accordance with JIS R3208 be 70% or more. The visible light transmittance is more preferably 75% or more.

Hereinafter, the present invention will be described in more detail with reference to examples. The present invention is not limited only to these examples.

(Polyvinyl Acetal Resin)

Polyvinyl acetal resins shown in the following Tables 1 to 4 were appropriately used. In all polyvinyl acetal resins used, n-butyraldehyde which has 4 carbon atoms is used for the acetalization.

With regard to the polyvinyl acetal resin, the acetalization degree (the butyralization degree), the acetylation degree and the content of the hydroxyl group were measured by a method in accordance with JIS K6728 "Testing methods for polyvinyl butyral". In this connection, even in the cases of being measured according to ASTM D1396-92, numerical values similar to those obtained by a method in accordance with JIS K6728 "Testing methods for polyvinyl butyral" were exhibited.

(Plasticizer)

Triethylene glycol di-2-ethylhexanoate (3GO)

(Filler)

Kind (1) (described as (1) in the following table): Nipgel AZ201 (silica particles, available from TOSOH SILICA CORPORATION, the specific surface area by the BET method of 300 $m^2/g$)

Kind (2) (described as (2) in the following table): AEROSIL 380 (silica particles, available from NIPPON AEROSIL CO., LTD., the specific surface area by the BET method of 380±30 $m^2/g$)

Kind (3) (described as (3) in the following table): Nipgel AZ204 (silica particles, available from TOSOH SILICA CORPORATION, the specific surface area by the BET method of 300 $m^2/g$)

Kind (4) (described as (4) in the following table): SYLYSIA 310P (silica particles, available from FUJI SILYSIA CHEMICAL LTD., the specific surface area by the BET method of 300 $m^2/g$)

(Ultraviolet Ray Screening Agent)

Tinuvin 326 (2-(2'-hydroxy-3'-t-butyl-5-methylphenyl)-5-chlorobenzotriazole, "Tinuvin 326" available from BASF Japan Ltd.)

(Oxidation Inhibitor)

BHT (2,6-di-t-butyl-p-cresol)

Example 1

Preparation of Composition for Forming First Layer and Third Layer

One hundred parts by weight of a polyvinyl acetal resin of a kind of shown in the following Table 1, 31 parts by weight of a plasticizer (3GO), 0.2 part by weight of an ultraviolet ray screening agent (Tinuvin 326) and 0.2 part by weight of an oxidation inhibitor (BHT) were mixed to obtain a composition for forming a first layer and a third layer.

Preparation of Composition for Forming Second Layer:

One hundred parts by weight of a polyvinyl acetal resin of a kind of shown in the following Table 1, 60 parts by weight of a plasticizer (3GO), 20 parts by weight of a kind of filler (Nipgel AZ201), 0.2 part by weight of an ultraviolet ray screening agent (Tinuvin 326) and 0.2 part by weight of an oxidation inhibitor (BHT) were mixed to obtain a composition for forming a second layer.

Preparation of Interlayer Film:

By coextruding the composition for forming a first layer and a third layer and the composition for forming a second layer using a coextruder, an interlayer film (780 μm in thickness) having a layered structure with a stack of a first layer (340 μm in thickness)/a second layer (100 μm in thickness)/a third layer (340 μm in thickness) was prepared.

In this connection, the coextrusion condition was as follows. The distance between a mold outlet used in the coextruder and a contact point on the first roll nearest to the mold, the linear velocity of an interlayer film between the mold outlet and the first roll and the temperature of the interlayer film were adjusted to be 12 cm, 0.6 m/minute and 175° C., respectively. The temperature of the interlayer film was decreased to 25° C. by making the interlayer film pass through the first roll and a second roll (a cooling roll). Furthermore, the temperature of the interlayer film was adjusted to be 90° C. by making the interlayer film pass through a third roll (a temperature adjusting roll) and the interlayer film was made to pass through a fourth roll (for example, an emboss pattern forming roll) the temperature of which is adjusted to 135° C. The velocity ratio of the fourth roll to the third roll was adjusted to 1.45 times. After being made to pass through the fourth roll, the temperature of the interlayer film was adjusted to 25° C. by making the interlayer film pass through a fifth roll (a cooling roll), after which the interlayer film was wound around a core at a linear velocity of 0.9 m/minute. In this connection, before an interlayer film is wound around a core, both end parts in the TD direction were cut out from an interlayer film with a length in the TD direction of 150 cm so that respective 25-cm portions from both ends were removed, and an interlayer film with a length in the ID direction of 100 cm was wound around a core.

Examples 2 to 4

An interlayer film was prepared in the same manner as that in Example 1 except that the kind of ingredients to be blended and the blending amount thereof for the composition for forming a first layer and a third layer and the composition for forming a second layer and the thicknesses of a first layer, a second layer and a third layer were set to those listed in the following Table 1, and furthermore, the thicknesses of a first layer, a second layer and a third layer were set to those listed in the following Table 1.

Comparative Example 1

An interlayer film was obtained under the same condition as that in Example 1 except that the temperature of an interlayer film was adjusted to be 100° C. when the interlayer film was made to pass through the third roll and the velocity ratio of the fourth roll to the third roll was set to 1.48 times.

Examples 5 to 15 and 21 to 26

An interlayer film was prepared in the same manner as that in Example 1 except that the kind of ingredients to be blended and the blending amount thereof for the composition for forming a first layer and a third layer and the composition for forming a second layer and the thicknesses of a first layer, a second layer and a third layer were set to those listed in the following Tables 2 to 4. In this connection, the coextrusion condition is the same as that in Example 1.

Examples 16 to 20

The kind of ingredients to be blended and the blending amount thereof for the composition for forming a first layer and a third layer and the composition for forming a second layer were set to those listed in the following Tables 3 to 4 to prepare compositions for preparing an interlayer film.

In this connection, the coextrusion condition was as follows, and interlayer films in which the thicknesses of a first layer, a second layer and a third layer were set to those listed in the following Tables 3 to 4 were prepared. The distance between a mold outlet used in the coextruder and a contact point on the first roll nearest to the mold, the linear velocity of an interlayer film between the mold outlet and the first roll and the temperature of the interlayer film were adjusted to be 12 cm, 0.6 m/minute and 175° C., respectively. The temperature of the interlayer film was decreased to 25° C. by making the interlayer film pass through the first roll and a second roll (a cooling roll). Furthermore, the temperature of the interlayer film was adjusted to be 90° C. by making the interlayer film pass through a third roll (a temperature adjusting roll) and the interlayer film was made to pass through a fourth roll (for example, an emboss pattern forming roll) the temperature of which is adjusted to 135° C. The velocity ratio of the fourth roll to the third roll was adjusted to 1.2 times. After being made to pass through the fourth roll, the temperature of the interlayer film was adjusted to 25° C. by making the interlayer film pass through a fifth roll (a cooling roll), after which the interlayer film was annealed for 2 minutes at 110° C. after being made to pass through the fifth roll. The interlayer film was wound around a core at a linear velocity of 0.7 m/minute. In this connection, before an interlayer film is wound around a core, both end parts in the TD direction were cut out from an interlayer film with a length in the TD direction of 150 cm so that respective 25-cm portions from both ends were removed, and an interlayer film with a length in the TD direction of 100 cm was wound around a core.

In this connection, in Tables 1 to 4, the description of contents of the ultraviolet ray screening agent and the oxidation inhibitor was omitted. In Examples 2 to 26 and Comparative Example 1, each of the ultraviolet ray screening agent and the oxidation inhibitor of the same kind as that in Example 1 was blended in an amount of 0.2 part by weight relative to 100 parts by weight of the polyvinyl acetal resin in a composition for forming a first layer and a third layer, and each of the ultraviolet ray screening agent and the oxidation inhibitor of the same kind as that in Example 1 was blended in an amount of 0.2 part by weight relative to 100 parts by weight of the polyvinyl acetal resin in a composition for forming a second layer.

(Evaluation)

(1) Softening Point and Glass Transition Temperature

The interlayer film obtained was stored for 1 month at a temperature of 23° C. and a humidity of 30%, after which each of the surface layers (the first layer and the third layer) was peeled off to be isolated and press-molded with a press molding machine to obtain an object to be measured. And with regard to the object to be measured, the measurement was performed using the "ARES-G2" available from TA Instruments Japan Inc. A parallel plate with a diameter of 8 mm was used as a jig, and the measurement was performed under the condition in which the temperature is decreased from 100° C. to −10° C. at a temperature decreasing rate of 3° C./minute and under the condition of a frequency of 1 Hz and a strain of 1%. In the measurement results obtained, the peak temperature of the loss tangent was defined as the glass transition temperature Tg (° C.). Moreover, the temperature at which a value of the loss tangent in a temperature region between 100° C. and Tg (° C.) becomes minimal was defined as the softening point. In this connection, even when the thickness of an object to be measured was controlled to 800 µm at the time of press-molding the isolated surface layer with a press molding machine, similar results were obtained.

(2) Thermal Shrinkage Ratio

By the method described above, an interlayer film A1 (a test specimen) as a section of 5 cm square which is a portion at a distance of 0.05X from one end in the TD direction toward the inside, an interlayer film A2 (a test specimen) as a section of 5 cm square which is a portion at a distance of 0.05X from the other end in the TD direction toward the inside, and an interlayer film A3 (a test specimen) as a section of 5 cm square which is a portion at a distance of 0.5X from each of the one end and the other end in the TD direction of the interlayer film toward the inside were obtained, and measured for the thermal shrinkage ratio by the method described above.

(3) Trim-Cut Performance

The interlayer film obtained was cut from one end to the other end in the TD direction so that the length in the MD direction of the interlayer film becomes 20 cm to obtain an interlayer film B. The interlayer film B was horizontally placed on a net rack so as not to suppress the dimensional change of the interlayer film B, and the moisture control thereof was performed for 2 days at 23° C. and 30% RH. Afterward, from the moisture-controlled interlayer film B, an interlayer film B1 (a test specimen) as a section of 5 cm square which is a portion at a distance of 0.5X from each of one end and the other end in the TD direction of the interlayer film toward the inside were obtained. An interlayer film B1 was positioned so that a line segment at a distance of 0.5X from each of one end and the other end in the TD direction toward the inside was overlapped with the center line of the interlayer film B1 to obtain the interlayer film B1 with a square shape of 15 cm square. On a fluororesin sheet ("Article number 7-363" available from AS ONE Corporation, 5 mm in thickness) preheated for 20 minutes in a hot air dryer at 140° C., the interlayer film B1 was horizontally laid without being fixed, and the interlayer film B1 was heated for 20 minutes at 140° C. The interlayer film B1 heated was subjected to punching with a super dumbbell cutter: SDBK-1000-T available from DUMBBELL CO., LTD. to obtain three pieces of test specimens. The test specimens obtained were stored for 12 hours at 23° C. and 30% RH. Afterward, using the TENSILON available from A&D Company, Limited in a constant temperature room at 25° C., a test specimen was vertically (upwardly and downwardly) pulled apart at a moving speed of 200 mm/min to perform a tear test for the test specimen. The maximum value of a load obtained in the period leading up to breakage was read, and the interlayer film was evaluated for the trim-cut performance on the basis of an average value (tear maximum load value) as a result obtained from three pieces of test specimens. In this connection, at the time of allowing a test specimen to be vertically (upwardly and downwardly) pulled apart, the vertical direction (up-down direction) and the MD direction were made to coincide with each other and the test was performed. In this connection, even when the vertical direction (up-down direction) and the TD direction were made to coincide with each other at the time of allowing a test specimen to be vertically (upwardly and downwardly) pulled apart and the test was performed, similar results were obtained.

The details and the results are shown in the following Tables 1 to 4. In this connection, in the following Tables 1 to 4, the description of ingredients to be blended other than the polyvinyl acetal resin, the plasticizer and the filler was omitted.

TABLE 1

| | | | | Example 1 | Example 2 | Example 3 | Example 4 | Comparative Example 1 |
|---|---|---|---|---|---|---|---|---|
| Composition of each of first and third layers | Each thickness | | μm | 340 | 340 | 340 | 355 | 340 |
| | Polyvinyl acetal resin | Average polymerization degree of PVA | | 1700 | 1700 | 1700 | 1700 | 1700 |
| | | Content of hydroxyl group | % by mole | 34.5 | 34.5 | 34.5 | 34.4 | 34.5 |
| | | Acetylation degree | % by mole | 0.8 | 0.8 | 0.8 | 0.8 | 0.8 |
| | | Acetalization degree | % by mole | 64.7 | 64.7 | 64.7 | 64.8 | 64.7 |
| | | Content | Parts by weight | 100 | 100 | 100 | 100 | 100 |
| | Plasticizer | Kind | | 3GO | 3GO | 3GO | 3GO | 3GO |
| | | Content | Parts by weight | 31 | 35 | 33 | 32.1 | 24 |
| Composition of second layer | Thickness | | μm | 100 | 100 | 100 | 70 | 100 |
| | Polyvinyl acetal resin | Average polymerization degree of PVA | | 1700 | 1700 | 1700 | 1700 | 1700 |
| | | Content of hydroxyl group | % by mole | 24.6 | 24.6 | 24.6 | 23.5 | 21.2 |
| | | Acetylation degree | % by mole | 14.1 | 14.1 | 14.1 | 13.3 | 12.6 |
| | | Acetalization degree | % by mole | 61.3 | 61.3 | 61.3 | 63.2 | 66.2 |
| | | Content | Parts by weight | 100 | 100 | 100 | 100 | 100 |
| | Plasticizer | Kind | | 3GO | 3GO | 3GO | 3GO | 3GO |
| | | Content | Parts by weight | 60 | 60 | 60 | 60 | 60 |
| | Filler | Kind | | (1) | (1) | (1) | (1) | (2) |
| | | Content | Parts by weight | 20 | 20 | 20 | 20 | 20 |
| Evaluation | Softening point of each of the first and third layers | | °C. | 70.4 | 71.2 | 71.2 | 72.5 | 76.2 |
| | Glass transition temperature of each of first and third layers | | °C. | 39.3 | 39.3 | 39.5 | 38.5 | 45.5 |
| | Thermal shrinkage ratio | MD1MAX | % | 34 | 31 | 30 | 41 | 48 |
| | | MD1MIN | % | 28 | 26 | 29 | 39 | 43 |
| | | MD2MAX | % | 22 | 28 | 26 | 33 | 37 |
| | | MD2MIN | % | 21 | 26 | 26 | 32 | 35 |
| | | MD3MAX | % | 24 | 27 | 24 | 30 | 32 |
| | | MD3MIN | % | 20 | 25 | 22 | 29 | 30 |
| | Trim-cut performance (tear maximum load value) | | N | 91.3 | 88.6 | 92.9 | 104.9 | 122 |

TABLE 2

| | | | | Example 5 | Example 6 | Example 7 | Example 8 |
|---|---|---|---|---|---|---|---|
| Composition of each of first and third layers | Each thickness | | μm | 340 | 340 | 340 | 340 |
| | Polyvinyl acetal resin | Average polymerization degree of PVA | | 1700 | 1700 | 1700 | 1700 |
| | | Content of hydroxyl group | % by mole | 30.5 | 34.5 | 34.5 | 34.5 |
| | | Acetylation degree | % by mole | 1 | 0.8 | 0.8 | 0.8 |
| | | Acetalization degree | % by mole | 68.5 | 64.7 | 64.7 | 64.7 |
| | | Content | Parts by weight | 100 | 100 | 100 | 100 |
| | Plasticizer | Kind | | 3GO | 3GO | 3GO | 3GO |
| | | Content | Parts by weight | 38.5 | 36 | 34 | 32 |
| Composition of second layer | Thickness | | μm | 100 | 100 | 100 | 100 |
| | Polyvinyl acetal resin | Average polymerization degree of PVA | | 3000 | 3100 | 3100 | 3100 |
| | | Content of hydroxyl group | % by mole | 24 | 24.3 | 24.3 | 24.3 |
| | | Acetylation degree | % by mole | 12 | 11.6 | 11.6 | 11.6 |
| | | Acetalization degree | % by mole | 64 | 64.1 | 64.1 | 64.1 |
| | | Content | Parts by weight | 100 | 100 | 100 | 100 |
| | Plasticizer | Kind | | 3GO | 3GO | 3GO | 3GO |
| | | Content | Parts by weight | 75 | 60 | 60 | 60 |
| | Filler | Kind | | — | — | — | — |
| | | Content | Parts by weight | — | — | — | — |
| Evaluation | Softening point of each of the first and third layers | | °C. | 64.1 | 69.7 | 71.2 | 71.7 |
| | Glass transition temperature of each of first and third layers | | °C. | 34.4 | 38.9 | 39.9 | 41.7 |
| | Thermal shrinkage ratio | MD1MAX | % | 36 | 36 | 38 | 40 |
| | | MD1MIN | % | 36 | 36 | 33 | 39 |
| | | MD2MAX | % | 44 | 36 | 36 | 42 |
| | | MD2MIN | % | 43 | 35 | 35 | 41 |
| | | MD3MAX | % | 32 | 33 | 32 | 36 |
| | | MD3MIN | % | 29 | 32 | 32 | 33 |
| | Trim-cut performance (tear maximum load value) | | N | 44.3 | 73.7 | 80.4 | 87.6 |

TABLE 2-continued

|  |  |  |  | Example 9 | Example 10 | Example 11 |
|---|---|---|---|---|---|---|
| Composition of each of first and third layers | Each thickness |  | μm | 340 | 340 | 340 |
|  | Polyvinyl acetal resin | Average polymerization degree of PVA |  | 1700 | 1700 | 1700 |
|  |  | Content of hydroxyl group | % by mole | 34.5 | 34.5 | 30.4 |
|  |  | Acetylation degree | % by mole | 0.8 | 0.8 | 0.9 |
|  |  | Acetalization degree | % by mole | 64.7 | 64.7 | 68.7 |
|  |  | Content | Parts by weight | 100 | 100 | 100 |
|  | Plasticizer | Kind |  | 3GO | 3GO | 3GO |
|  |  | Content | Parts by weight | 30 | 28 | 39.5 |
| Composition of second layer | Thickness |  | μm | 100 | 100 | 100 |
|  | Polyvinyl acetal resin | Average polymerization degree of PVA |  | 3100 | 3100 | 3050 |
|  |  | Content of hydroxyl group | % by mole | 24.3 | 24.3 | 24.2 |
|  |  | Acetylation degree | % by mole | 11.6 | 11.6 | 11.4 |
|  |  | Acetalization degree | % by mole | 64.1 | 64.1 | 64.4 |
|  |  | Content | Parts by weight | 100 | 100 | 100 |
|  | Plasticizer | Kind |  | 3GO | 3GO | 3GO |
|  |  | Content | Parts by weight | 60 | 60 | 60 |
|  | Filler | Kind |  | — | — | — |
|  |  | Content | Parts by weight | — | — | — |
| Evaluation | Softening point of each of the first and third layers |  | ° C. | 74.6 | 72.0 | 62.8 |
|  | Glass transition temperature of each of first and third layers |  | ° C. | 42.0 | 43.1 | 32.7 |
|  | Thermal shrinkage ratio | MD1MAX | % | 38 | 39 | 33 |
|  |  | MD1MIN | % | 38 | 39 | 32 |
|  |  | MD2MAX | % | 40 | 44 | 35 |
|  |  | MD2MIN | % | 40 | 41 | 34 |
|  |  | MD3MAX | % | 33 | 37 | 30 |
|  |  | MD3MIN | % | 32 | 35 | 26 |
|  | Trim-cut performance (tear maximum load value) |  | N | 83.5 | 89.2 | 44.8 |

TABLE 3

|  |  |  |  | Example 12 | Example 13 | Example 14 |
|---|---|---|---|---|---|---|
| Composition of each of first and third layers | Each thickness |  | μm | 340 | 340 | 340 |
|  | Polyvinyl acetal resin | Average polymerization degree of PVA |  | 1700 | 1700 | 1700 |
|  |  | Content of hydroxyl group | % by mole | 30.4 | 30.4 | 30.4 |
|  |  | Acetylation degree | % by mole | 0.9 | 0.9 | 0.9 |
|  |  | Acetalization degree | % by mole | 68.7 | 68.7 | 68.7 |
|  |  | Content | Parts by weight | 100 | 100 | 100 |
|  | Plasticizer | Kind |  | 3GO | 3GO | 3GO |
|  |  | Content | Parts by weight | 37.5 | 35.5 | 33.5 |
| Composition of second layer | Thickness |  | μm | 100 | 100 | 100 |
|  | Polyvinyl acetal resin | Average polymerization degree of PVA |  | 3050 | 3050 | 3050 |
|  |  | Content of hydroxyl group | % by mole | 24.2 | 24.2 | 24.2 |
|  |  | Acetylation degree | % by mole | 11.4 | 11.4 | 11.4 |
|  |  | Acetalization degree | % by mole | 64.4 | 64.4 | 64.4 |
|  |  | Content | Parts by weight | 100 | 100 | 100 |
|  | Plasticizer | Kind |  | 3GO | 3GO | 3GO |
|  |  | Content | Parts by weight | 60 | 60 | 60 |
|  | Filler | Kind |  | — | — | — |
|  |  | Content | Parts by weight | — | — | — |
| Evaluation | Softening point of each of the first and third layers |  | ° C. | 63.9 | 64.8 | 65.4 |
|  | Glass transition temperature of each of first and third layers |  | ° C. | 33.7 | 34.2 | 35.4 |
|  | Thermal shrinkage ratio | MD1MAX | % | 36 | 37 | 33 |
|  |  | MD1MIN | % | 35 | 35 | 33 |
|  |  | MD2MAX | % | 36 | 40 | 40 |
|  |  | MD2MIN | % | 35 | 36 | 39 |
|  |  | MD3MAX | % | 38 | 31 | 39 |
|  |  | MD3MIN | % | 32 | 30 | 35 |
|  | Trim-cut performance (tear maximum load value) |  | N | 46.7 | 53.8 | 69.7 |

TABLE 3-continued

|  |  |  |  | Example 15 | Example 16 | Example 17 |
|---|---|---|---|---|---|---|
| Composition of each of first and third layers | Each thickness |  | μm | 340 | 350 | 360 |
|  | Polyvinyl acetal resin | Average polymerization degree of PVA |  | 1700 | 1700 | 1700 |
|  |  | Content of hydroxyl group | % by mole | 30.4 | 33.9 | 33.9 |
|  |  | Acetylation degree | % by mole | 0.9 | 0.8 | 0.8 |
|  |  | Acetalization degree | % by mole | 68.7 | 65.3 | 65.3 |
|  |  | Content | Parts by weight | 100 | 100 | 100 |
|  | Plasticizer | Kind |  | 3GO | 3GO | 3GO |
|  |  | Content | Parts by weight | 31.5 | 32 | 32 |
| Composition of second layer | Thickness |  | μm | 100 | 80 | 60 |
|  | Polyvinyl acetal resin | Average polymerization degree of PVA |  | 3050 | 1700 | 1700 |
|  |  | Content of hydroxyl group | % by mole | 24.2 | 23.1 | 23.1 |
|  |  | Acetylation degree | % by mole | 11.4 | 12.5 | 12.5 |
|  |  | Acetalization degree | % by mole | 64.4 | 64.4 | 64.4 |
|  |  | Content | Parts by weight | 100 | 100 | 100 |
|  | Plasticizer | Kind |  | 3GO | 3GO | 3GO |
|  |  | Content | Parts by weight | 60 | 60 | 60 |
|  | Filler | Kind |  | — | (3) | (3) |
|  |  | Content | Parts by weight | — | 20 | 20 |
| Evaluation | Softening point of each of the first and third layers |  | ° C. | 66.0 | 72.2 | 72.9 |
|  | Glass transition temperature of each of first and third layers |  | ° C. | 35.7 | 40.6 | 40.6 |
|  | Thermal shrinkage ratio | MD1MAX | % | 34 | 38 | 32 |
|  |  | MD1MIN | % | 33 | 36 | 32 |
|  |  | MD2MAX | % | 40 | 35 | 32 |
|  |  | MD2MIN | % | 38 | 34 | 31 |
|  |  | MD3MAX | % | 35 | 35 | 31 |
|  |  | MD3MIN | % | 35 | 34 | 30 |
|  | Trim-cut performance (tear maximum load value) |  | N | 61.6 | 81.0 | 90.8 |

TABLE 4

|  |  |  |  | Example 18 | Example 19 | Example 20 | Example 21 | Example 22 |
|---|---|---|---|---|---|---|---|---|
| Composition of each of first and third layers | Each thickness |  | μm | 350 | 350 | 350 | 290 | 290 |
|  | Polyvinyl acetal resin | Average polymerization degree of PVA |  | 1700 | 1700 | 1700 | 1700 | 1700 |
|  |  | Content of hydroxyl group | % by mole | 30.8 | 30.8 | 30.8 | 30.8 | 30.8 |
|  |  | Acetylation degree | % by mole | 0.8 | 0.8 | 0.8 | 0.8 | 0.8 |
|  |  | Acetalization degree | % by mole | 68.4 | 68.4 | 68.4 | 68.4 | 68.4 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 30 | 32 | 34 | 30 | 32 |
| Composition of second layer | Thickness |  | μm | 80 | 80 | 80 | 200 | 200 |
|  | Polyvinyl acetal resin | Average polymerization degree of PVA |  | 1700 | 1700 | 1700 | 3000 | 3000 |
|  |  | Content of hydroxyl group | % by mole | 21.2 | 21.2 | 21.2 | 24.4 | 24.4 |
|  |  | Acetylation degree | % by mole | 17.2 | 17.2 | 17.2 | 12 | 12 |
|  |  | Acetalization degree | % by mole | 61.6 | 61.6 | 61.6 | 63.6 | 63.6 |
|  |  | Content | Parts by weight | 100 | 100 | 100 | 100 | 100 |
|  | Plasticizer | Kind |  | 3GO | 3GO | 3GO | 3GO | 3GO |
|  |  | Content | Parts by weight | 60 | 60 | 60 | 60 | 60 |
|  | Filler | Kind |  | (4) | (4) | (4) | — | — |
|  |  | Content | Parts by weight | 20 | 20 | 20 | — | — |
| Evaluation | Softening point of each of the first and third layers |  | ° C. | 66.1 | 65.8 | 65.2 | 66.6 | 66.0 |
|  | Glass transition temperature of each of first and third layers |  | ° C. | 36.4 | 35.6 | 34.9 | 36.2 | 35.6 |
|  | Thermal shrinkage ratio | MD1MAX | % | 34 | 33 | 34 | 34 | 36 |
|  |  | MD1MIN | % | 32 | 31 | 32 | 32 | 34 |
|  |  | MD2MAX | % | 39 | 40 | 40 | 39 | 40 |
|  |  | MD2MIN | % | 38 | 39 | 39 | 38 | 39 |
|  |  | MD3MAX | % | 35 | 35 | 34 | 35 | 37 |
|  |  | MD3MIN | % | 33 | 33 | 32 | 33 | 35 |
|  | Trim-cut performance (tear maximum load value) |  | N | 61.1 | 59.6 | 56.7 | 63.5 | 60.6 |

TABLE 4-continued

| | | | | Example 23 | Example 24 | Example 25 | Example 26 |
|---|---|---|---|---|---|---|---|
| Composition of each of first and third layers | Polyvinyl acetal resin | Each thickness | μm | 290 | 303 | 303 | 303 |
| | | Average polymerization degree of PVA | | 1700 | 1700 | 1700 | 1700 |
| | | Content of hydroxyl group | % by mole | 30.8 | 30.8 | 30.8 | 30.8 |
| | | Acetylation degree | % by mole | 0.8 | 0.8 | 0.8 | 0.8 |
| | | Acetalization degree | % by mole | 68.4 | 68.4 | 68.4 | 68.4 |
| | | Content | Parts by weight | 100 | 100 | 100 | 100 |
| | Plasticizer | Kind | | 3GO | 3GO | 3GO | 3GO |
| | | Content | Parts by weight | 34 | 31 | 33 | 35 |
| Composition of second layer | | Thickness | μm | 200 | 174 | 174 | 174 |
| | Polyvinyl acetal resin | Average polymerization degree of PVA | | 3000 | 3000 | 3000 | 3000 |
| | | Content of hydroxyl group | % by mole | 24.4 | 24.4 | 24.4 | 24.4 |
| | | Acetylation degree | % by mole | 12 | 12 | 12 | 12 |
| | | Acetalization degree | % by mole | 63.6 | 63.6 | 63.6 | 63.6 |
| | | Content | Parts by weight | 100 | 100 | 100 | 100 |
| | Plasticizer | Kind | | 3GO | 3GO | 3GO | 3GO |
| | | Content | Parts by weight | 60 | 60 | 60 | 60 |
| | Filler | Kind | | — | — | — | — |
| | | Content | Parts by weight | — | — | — | — |
| Evaluation | | Softening point of each of the first and third layers | °C. | 65.4 | 66.6 | 65.5 | 64.9 |
| | | Glass transition temperature of each of first and third layers | °C. | 35.0 | 35.9 | 35.3 | 34.6 |
| | Thermal shrinkage ratio | MD1MAX | % | 37 | 33 | 34 | 34 |
| | | MD1MIN | % | 35 | 31 | 32 | 32 |
| | | MD2MAX | % | 41 | 38 | 40 | 39 |
| | | MD2MIN | % | 40 | 37 | 39 | 38 |
| | | MD3MAX | % | 37 | 34 | 35 | 34 |
| | | MD3MIN | % | 35 | 32 | 33 | 32 |
| | | Trim-cut performance (tear maximum load value) | N | 57.7 | 63.5 | 58.2 | 55.1 |

EXPLANATION OF SYMBOLS

1: First layer
1a: Outer surface
2: Second layer
2a: First surface
2b: Second surface
3: Third layer
3a: Outer surface
11, 11A: Interlayer film
11a: First surface
11b: Second surface
21: First lamination glass member
22: Second lamination glass member
31, 31A: Laminated glass

The invention claimed is:

1. An interlayer film for laminated glass having a one-layer structure or a two or more-layer structure, comprising a first layer containing a thermoplastic resin,
the softening point of the first layer being 60° C. or more,
the interlayer film having an MD direction and a TD direction, and
with regard to thermal shrinkage ratios obtained when the following first inside portion, the following second inside portion and the following central portion are heated for 20 minutes at 140° C. respectively, all of the following thermal shrinkage ratio MD1MAX, the following thermal shrinkage ratio MD2MAX and the following thermal shrinkage ratio MD3MAX being 45% or less and at least one thermal shrinkage ratio among the thermal shrinkage ratio MD1MIN, the thermal shrinkage ratio MD2MIN and the thermal shrinkage ratio MD3MIN is more than 20% a first inside portion: being represented as a section of 5 cm square which is a portion at a distance of 0.05X from one end in the TD direction toward the inside of the interlayer film when a distance between the one end and the other end in the TD direction of the interlayer film is defined as X
a second inside portion: being represented as a section of 5 cm square which is a portion at a distance of 0.05X from the other end in the ID direction toward the inside of the interlayer film when a distance between the one end and the other end in the TD direction of the interlayer film is defined as X
a central portion: being represented as a section of 5 cm square which is a portion at a distance of 0.5X from each of the one end and the other end in the TD direction toward the inside of the interlayer film when a distance between the one end and the other end in the TD direction of the interlayer film is defined as X
a thermal shrinkage ratio MD1MAX and a thermal shrinkage ratio MD1MIN: a thermal shrinkage ratio of a side higher in thermal shrinkage ratio and a thermal shrinkage ratio of a side lower in thermal shrinkage ratio respectively being defined as MD1MAX and MD1MIN in the case where two sides parallel to the MD direction of the first inside portion are different in thermal shrinkage ratio, or a thermal shrinkage ratio of one side and a thermal shrinkage ratio of the other side respectively being defined as MD1MAX and MD1MIN in the case where two sides parallel to the MD direction of the first inside portion are the same in thermal shrinkage ratio
a thermal shrinkage ratio MD2MAX and a thermal shrinkage ratio MD2MIN: a thermal shrinkage ratio of a side higher in thermal shrinkage ratio and a thermal shrinkage ratio of a side lower in thermal shrinkage ratio respectively being defined as MD2MAX and MD2MIN in the case where two sides parallel to the MD direction of the second inside portion are different in thermal shrinkage ratio, or a thermal shrinkage ratio of one side and a thermal shrinkage ratio of the other side respectively being defined as MD2MAX and MD2MIN in the case where two sides parallel to the MD direction of the second inside portion are the same in thermal shrinkage ratio a thermal shrinkage ratio MD3MAX and a thermal shrinkage ratio MD3MIN: a thermal shrinkage ratio of a side higher in thermal shrinkage ratio and a thermal shrinkage ratio of a side lower in thermal shrinkage ratio respectively being defined as MD3MAX and MD3MIN in the case where two sides parallel to the MD direction of the central portion are different in thermal shrinkage ratio, or a thermal shrinkage ratio of one side and a thermal shrinkage ratio of the other side respectively being defined as MD3MAX and MD3MIN in the case where two sides parallel to the MD direction of the central portion are the same in thermal shrinkage ratio.

2. The interlayer film for laminated glass according to claim 1, wherein the softening point of the first layer is 61.5° C. or more.

3. The interlayer film for laminated glass according to claim 1, wherein the glass transition temperature of the first layer is 35° C. or more.

4. The interlayer film for laminated glass according to claim 1, further comprising a second layer containing a thermoplastic resin,
the first layer being arranged on a first surface side of the second layer.

5. The interlayer film for laminated glass according to claim 4, wherein the thermoplastic resin in the first layer is a polyvinyl acetal resin and the thermoplastic resin in the second layer is a polyvinyl acetal resin.

6. The interlayer film for laminated glass according to claim 5, wherein the content of the hydroxyl group of the polyvinyl acetal resin in the first layer is larger by 9.5% by mole or more than the content of the hydroxyl group of the polyvinyl acetal resin in the second layer.

7. The interlayer film for laminated glass according to claim 4, wherein the second layer contains filler.

8. The interlayer film for laminated glass according to claim 4, further comprising a third layer containing a thermoplastic resin,
the third layer being arranged on a second surface side at the opposite side of the first surface of the second layer.

9. The interlayer film for laminated glass according to claim 1, wherein the thermoplastic resin in the first layer is a polyvinyl acetal resin and
the content of the hydroxyl group of the polyvinyl acetal resin in the first layer is 33% by mole or more.

10. The interlayer film for laminated glass according to claim 1, wherein the first layer contains a plasticizer and
the content of the plasticizer in the first layer is 25 parts by weight or more and 35 parts by weight or less relative to 100 parts by weight of the thermoplastic resin in the first layer.

11. The interlayer film for laminated glass according to claim 1, wherein all of the thermal shrinkage ratio MD1MAX, the thermal shrinkage ratio MD2MAX and the thermal shrinkage ratio MD3MAX are 40% or less.

12. The interlayer film for laminated glass according to claim 1, wherein all of the thermal shrinkage ratio MD1MIN, the thermal shrinkage ratio MD2MIN and the thermal shrinkage ratio MD3M IN are 20% or more.

13. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

14. The interlayer film for laminated glass according to claim 1, wherein all of the thermal shrinkage ratio MD1MIN, the thermal shrinkage ratio MD2MIN and the thermal shrinkage ratio MD3MIN is 15% or more.

* * * * *